Oct. 12, 1937. A. J. PENICK ET AL Re. 20,529

TUBING HEAD

Original Filed Oct. 27, 1934

Inventors
Arthur J. Penick
Kirby T. Penick

By Hardway & Cathey
Attorneys

Reissued Oct. 12, 1937 Re. 20,529

UNITED STATES PATENT OFFICE 20,529

TUBING HEAD

Arthur J. Penick and Kirby T. Penick,
Houston, Tex.

Original No. 2,046,579, dated July 7, 1936, Serial No. 750,310, October 27, 1934. Application for reissue February 16, 1937, Serial No. 126,008

9 Claims. (Cl. 285—22)

This invention relates to a tubing head.

An object of the invention is to provide a tubing head having a hanger therein designed to couple with and suspend an inner tubing in a well and to form a close fit with the head proper so as to close the space between the tubing and the outer pipe or casing.

Another object of the invention is to provide a novel means for locking the hanger and the tubing supported thereby in position to the end that they will not be displaced by internal pressure in the well; the means for securing the hanger against displacement from the head proper is accessible from the outside of the head so that the same can be conveniently manipulated into position to lock the hanger in place or to release the same.

Means have been heretofore provided for locking or securing the hanger in position on the seat in the head, but such locking means have been placed within the head and are not readily accessible without removing the blowout preventer or other connection at the top of the head or working through said preventer or connection; or such locking means has not sealed the head particularly thereabove. It is one of the objects of this invention to provide means for securing the hanger on the seat of the head which may be conveniently manipulated into either active or inactive positions and which will insure the sealing of the head particularly thereabove.

It will be seen that in accordance with this invention the tubing head having an inside supporting seat has arranged therein a tubular hanger which is in the form of a tubular structure having a seat cooperating with the seat in the head and which is adapted to receive and suspend a tubing in the head. This tubing head has a locking device mounted for radial adjustment in the head to engage and disengage the hanger and there are provided means for sealing this locking device in the head. In accordance with an embodiment of this invention the tubing head has a connection above its inside supporting seat which together with a means for sealing the locking device in said head also seals the connection above that inside supporting seat. The locking device is capable by its adjustment not only to engage and disengage the hanger but to force it into sealing engagement with the head.

With the above and other objects in view, the invention has particular relation to certain novel features of construction, operation, and arrangement of parts, an example of which is given in this specification and illustrated in the accompanying drawing, wherein:—

Figure 1:
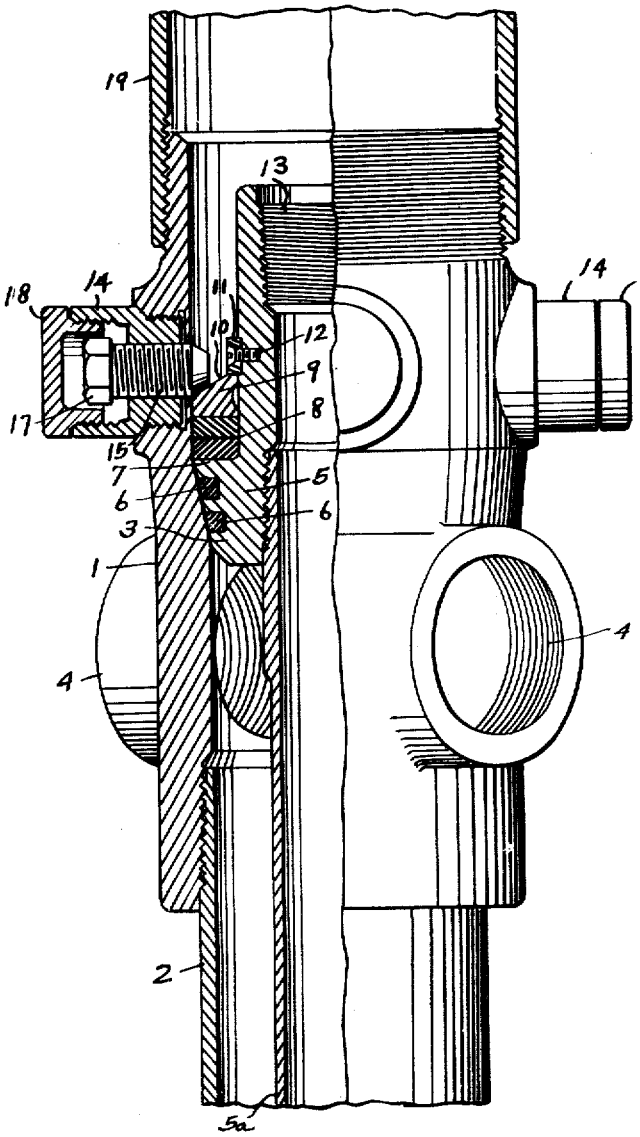
Figure 1 is a side elevation of the head, partly in section, showing one embodiment of the invention.

Referring now more particularly to the drawing wherein like numerals of reference designate similar parts in each of the figures, the numeral 1 designates a tubular casing head adapted to be connected to the upper end of the well casing 2 and having the inside downwardly converging supporting seat 3. The head 1 has the lateral connections 4, 4, beneath said seat for the connection of flow-lines thereto. On the seat 3 there is the tubular hanger 5 whose lower end is formed into a downwardly tapered seat to conform to and cooperate with the taper of and to fit within the seat 3. The tapering portion of the hanger has the surrounding packing rings 6 seated in grooves therein and forming a fluid-tight joint with said seat 3. Above the tapered portion of the hanger it is reduced in diameter forming an external annular shoulder 7 on which is located packing rings 8 and on these rings there is a metal hold-down ring 9 whose upper side is downwardly and outwardly tapering, as at 10.

A lock ring 11 surrounds the reduced upper end of the hanger and is countersunk into the hanger and secured therein by suitable set screws 12 and abuts the upper end of the ring 9 to hold the same securely in place. A very efficient packing is thus formed between the hanger and the head proper.

The upper end of the hanger is internally threaded, as at 13, to couple with and receive the externally threaded lower end of a section of pipe through which the hanger, and the tubing 5a suspended therefrom, may be handled in lowering or withdrawing same from the well.

One or more housings 14, 14, are threaded into, or through, the head, above the seat 3, and threaded through these housings are adjustable locking devices, such as the locking screws 15; these locking devices are capable of radial adjustment to engage and disengage the hanger. The inner ends of these screws are beveled, or tapered, to conform to the taper of the face 10. When the hanger 5 is landed into place on the seat 3, the screws 15 may be screwed inwardly by the application of a wrench to the heads 17 thereof, and the tapered inner ends 16 will engage over the face 10 of the lock rings 9 to lock the hanger in place and to expand the packing rings 8. This also forces the hanger into sealing connection with the head by engagement of the cooperating seats.

The outer ends of the housings 14 may be closed by the caps 18, which are screwed thereto to seal the locking devices in the head and its connection thereabove.

When it is desired to withdraw the tubing, the caps 18 may be removed and the screws 16 screwed outwardly to clear the ring 9 and the hanger and tubing then withdrawn. In withdrawing the tubing, particularly when there is pressure in the well, it is withdrawn through a suitable blowout preventer attached to the upper end of the head 1 and of any conventional construction and which, with its tubular connection, has been designated generally by the numeral 19. This blowout preventer is provided to confine the pressure, and while the tubing is being withdrawn under such circumstances, the caps 18 should be screwed back into place so as to prevent any leakage past the screws 15.

Figure 2:
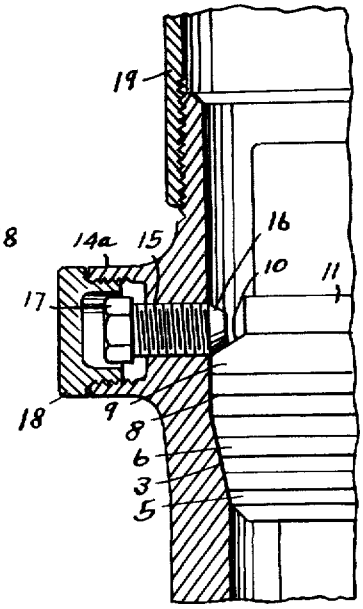
Figure 2 shows a fragmentary vertical sectional view of another form thereof.

In the form shown in Figure 2 the housings 14*a* are formed integrally with the head, and screws 15 are screwed through the wall of the head.

Figure 3:
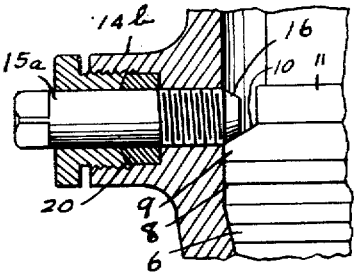
Figure 3 shows a fragmentary sectional view of still another embodiment.

In the form shown in Figure 3 the caps 18 have been dispensed with and suitable sealing means, such as stuffing boxes 20, of conventional construction are located within the housings 14*b*, and form fluid-tight joints about the screws 15*a*, thus sealing said screws, or locking devices, in said head and its said connection thereabove.

The forms shown in Figures 2 and 3 are the same as that shown in Figure 1, excepting as hereinabove pointed out.

The drawing and description disclose what is now considered to be a preferred form of the invention by way of illustration only, while the broad principle of the invention will be defined by the appended claims.

What we claim is:

1. In combination a tubular head having an inside supporting seat, a tubular hanger on the seat and adapted to couple with and suspend a tubing in said head, a housing on the head, a substantially radial locking device in the housing and having a threaded connection whereby it may be screwed into active position to engage the hanger and into inactive position to release the hanger, and a stuffing box in the housing fitted around said locking device.

2. The combination with a tubular head having an inside seat, of a tubular hanger on the seat and adapted to couple with and suspend a tubing in said head, said hanger having an external tapering face and a surrounding packing, means extending through the wall of the head and forming a leak-proof joint therewith and including a screw having a threaded connection with the head and extending in a substantially radial direction and adapted to be screwed inwardly to engage said tapered face and expand said packing and also to secure the hanger on said seat and also adapted to be screwed outwardly to release said packing and hanger.

3. The combination with a tubular head having an inside seat and formed for the attachment of a blow out preventer to the upper end thereof, of a tubular hanger on the seat and adapted to couple with and suspend a tubing in said head, said hanger having an external tapering face, and a packing therearound, hanger-engaging means having a threaded connection with the head, and extending in a substantially radial direction and adapted to be screwed inwardly to engage said tapering face, and expand said packing, as well as to secure the hanger on the seat, said means being also adapted to be screwed outwardly to release both the packing and the hanger and means for preventing the escape of fluid under pressure outwardly past the hanger-engaging means.

4. A tubular tubing hanger having surrounding packing seated therein and having its upper end reduced to form an external annular upwardly facing shoulder above said packing, an annular packing around the reduced portion of the hanger and seated on said shoulder, a metal hold-down ring around the hanger and on the last-mentioned packing whose upper side tapers downwardly and outwardly.

5. In combination, a tubular head having an inside, downwardly tapering seat, a tubular blowout preventer connection on the head whose inside diameter is not less than the minimum inside diameter of the head, a tubular hanger whose lower end is externally tapered to fit said seat, the tapered portion of the head having external annular packing therearound which is countersunk into the hanger and which forms a fluid-tight joint with said seat, said hanger having an external upwardly facing shoulder, annular packing on said shoulder forming fluid-tight joints with the hanger and with the head, an annular hold-down ring on the last-mentioned packing whose upper surface is downwardly and outwardly tapered, a locking ring around and countersunk into the hanger and abutting the upper side of the hold-down ring, locking screws threaded through the head radially and whose inner ends are beveled to conform to the tapering portion of and to engage with the tapering upper side of the hold-down ring, and means for preventing the escape of gas under pressure outwardly through the threads connecting the locking screws to the head.

6. In a tubing head, a tubular tubing hanger having an annular external upwardly facing shoulder, annular packing around the hanger on said shoulder, a rigid ring around the hanger on the packing, a locking ring around the hanger for securing the assembly together whereby it may be lowered into, and withdrawn from, the head as a unit.

7. In a tubing head, a tubular hanger formed for the connection of a tubing thereto and having an external annular upwardly facing shoulder thereon, annular packing around the hanger on said shoulder, a metal ring around the hanger on the packing whose upper face is downwardly and outwardly tapered, and means for maintaining said ring and packing assembled as a unit with the hanger.

8. The combination with a tubular head having an inside supporting seat, of a tubular hanger having a cooperating seat and adapted to couple with and suspend a tubing in said head, a locking device mounted for radial adjustment in said head to engage and disengage said hanger, and means for sealing said locking device in said head.

9. The combination with a tubular head having an inside supporting seat and having connection means thereabove, of a tubular hanger having a cooperating seat and adapted to couple with and suspend a tubing in said head, a locking device mounted for radial adjustment in said head to engage and disengage said hanger, and means for sealing said locking device in said head.

ARTHUR J. PENICK.
KIRBY T. PENICK.

DISCLAIMER

Re. 20,529.—*Arthur J. Penick* and *Kirby T. Penick*, Houston, Tex. TUBING HEAD. Patent dated October 12, 1937. Disclaimer filed March 8, 1939, by the patentees.

Hereby disclaim from the combination of the recited elements of each and every one of claims 1, 2, 3, 8, and 9 of said Letters Patent and do hereby exclude from the scope of each and every one of said claims:

1. All tubular heads, except tubular casing heads constructed and adapted for lateral flow line connections.

2. All tubular hangers, except such as are constructed and adapted to threadedly couple with and suspend a tubing in the casing head.

[*Official Gazette April 4, 1939.*]